United States Patent Office 2,966,811
Patented Jan. 3, 1961

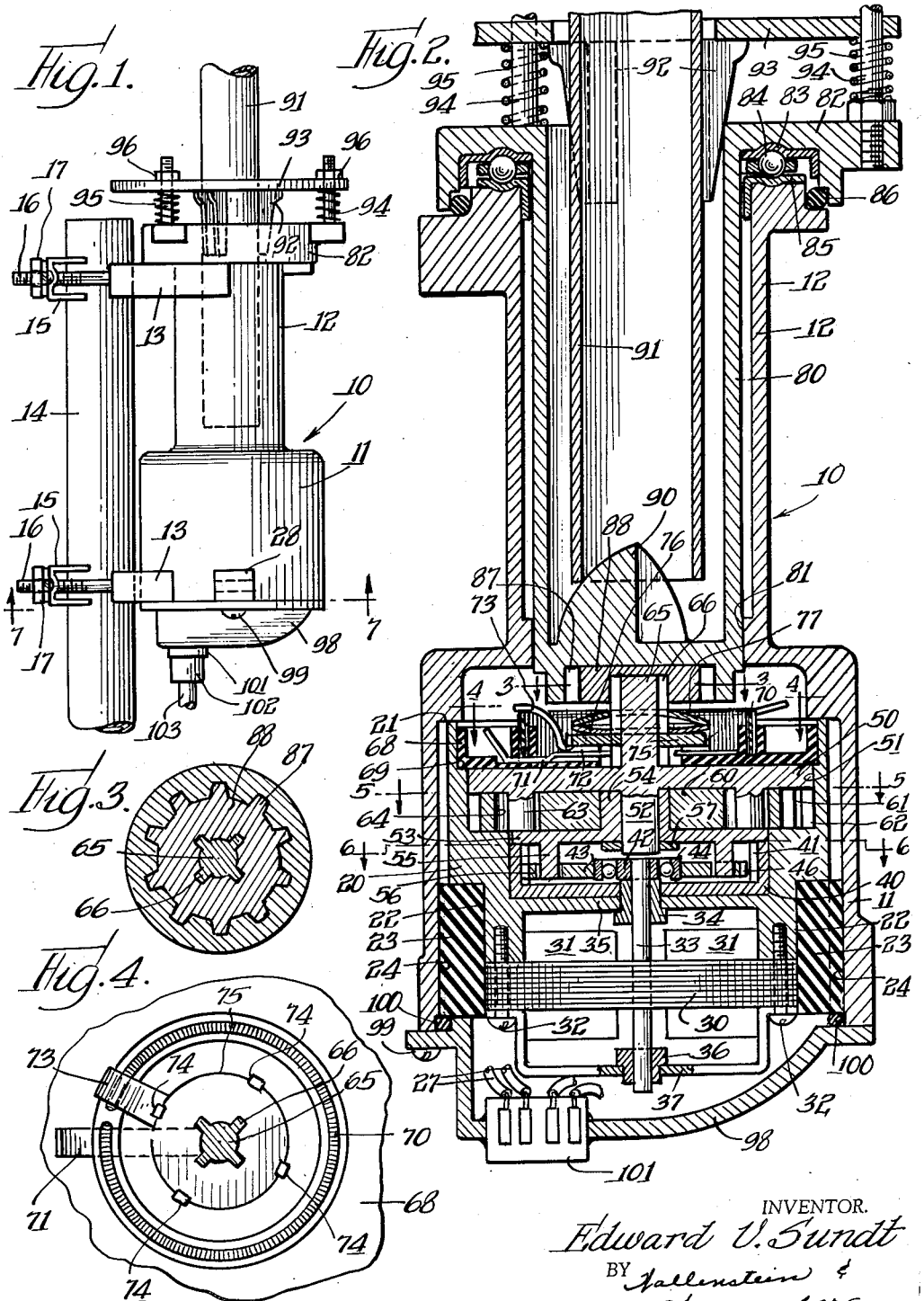

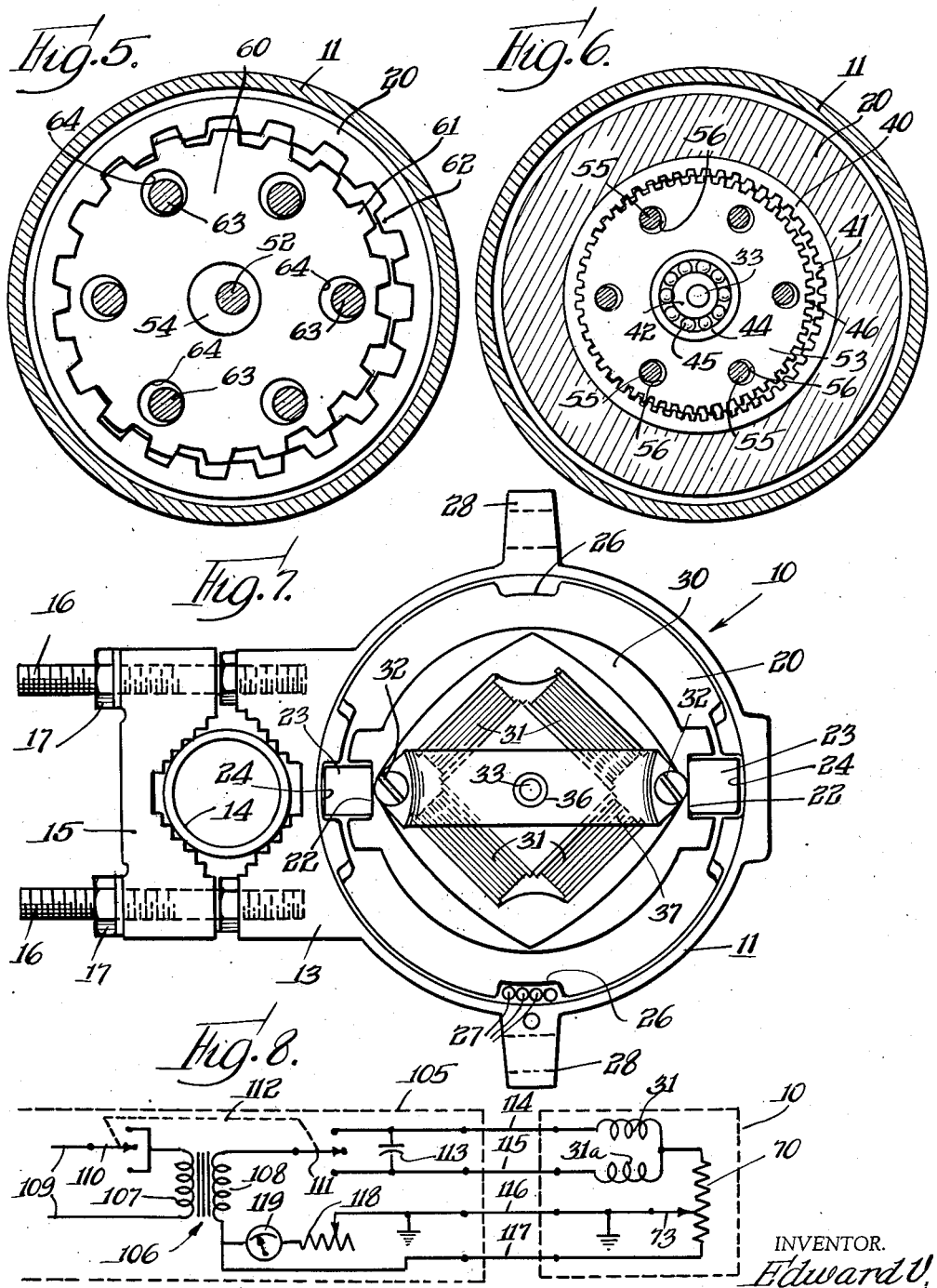

2,966,811

ROTATOR MECHANISM FOR ANTENNAS OR THE LIKE

Edward V. Sundt, 118 Sterling Lane, Wilmette, Ill.

Filed June 1, 1959, Ser. No. 817,322

9 Claims. (Cl. 74—804)

The principal object of this invention is to provide an improved rotator mechanism for antennas or the like, which is simple and compact in construction and foolproof and accurate in operation, which is inexpensive to manufacture and assemble, which is rugged and strong, and which effectively absorbs impact shocks occassioned by wind.

Briefly, the rotator mechanism of this invention includes a main supporting housing having a longitudinal vertical central axis and means for mounting the same on a post or the like. A gear housing is secured within the supporting housing concentrically with the central axis of the central housing and preferably the gear housing is resiliently secured therein so as to permit relative resilient movement therebetween for shock absorbing purposes. An electric motor is secured to the gear housing and it has a motor shaft which is concentric with the central axis, the motor shaft being selectively rotated in one direction or the other.

A differential gear reducer means is arranged within the gear housing concentrically with the central axis and preferably it includes an accurate and efficient high speed first differential gear reducer having close tolerances driven by the motor shaft and a less accurate and slower speed second differential gear reducer having wide tolerances and being resiliently driven by the first differential gear reducer. A rotator member is rotatably mounted in the supporting housing concentrically with the supporting axis for rotating the antenna or the like, the rotator member being coupled to the output of the second differential gear reducer. Each differential gear reducer preferably includes an input member in the form of an eccentric, a stationary internal toothed annulus and an external toothed rotor rotatably mounted on the eccentric and meshing with the internal toothed annulus, the reduced speed output being obtained by coupling to the rotor.

By reason of the differential gear reducer means and the concentric relation of all of the parts, an extremely rugged and compact rotator mechanism is realized which utilizes a minimum of parts, which is small in dimension, and which may be readily and inexpensively manufactured and assembled. Since the electric motor and the differential gear reducer means are all carried by the gear housing, proper operation thereof is assured. Because the gear housing is resiliently mounted in the supporting housing, flexing of the supporting housing will not cause any appreciable stressing of the gear housing so as not to affect the proper operation of the parts carried thereby. The resilient mounting also effectively absorbs shocks due to wind and the like and prevents transmission thereof to the gear housing and its operating parts.

The coupling between the rotator member and the output member also minimizes the transmission of shocks from the rotator member to the differential gear reducer means in the gear housing. Further transmission of any such shocks is largely prevented by the non-reversible acting second differential gear reducer. Any unusual stressing of or loads in the second differential gear reducer are not reflected back to the close tolerance first differential gear reducer since the resilient coupling between the two gear reducers acts as an absorber and effectively isolates them.

The operation of the electric motor in one direction or the other is remotely controlled from a remote control station, and in order to indicate at the remote control station the rotative position of the rotator member and hence the antenna, a meter at the control station is controlled by a potentiometer in the rotator mechanism. Here, the potentiometer is also preferably carried by the gear housing concentrically with the central axis and is adjusted by the output member of the differential gear reducer means in accordance with the rotative position thereof.

Further objects of this invention reside in the details of construction of the rotator mechanism and in the cooperative relationships between the component parts thereof.

Other objects and advantages of this invention will become apparent to those skilled in the art upon reference to the accompanying specification, claims and drawings in which:

Fig. 1 is a side elevational view of the rotator mechanism of this invention showing the same attached to a post and rotating an antenna mast;

Fig. 2 is an enlarged vertical sectional view through the rotator mechanism of Fig. 1;

Fig. 3 is a horizontal sectional view taken substantially along the line 3—3 of Fig. 2;

Fig. 4 is a horizontal sectional view taken substantially along the line 4—4 of Fig. 2;

Fig. 5 is a horizontal sectional view taken substantially along the line 5—5 of Fig. 2;

Fig. 6 is a horizontal sectional view taken substantially along the line 6—6 of Fig. 2;

Fig. 7 is a horizontal sectional view taken substantially along the line 7—7 of Fig. 1; and Fig. 8 is a wiring diagram of the control for the electric motor for rotating the rotator mechanism and for indicating the position thereof.

Referring first to Figs. 1–7, the rotator mechanism of this invention is generally designated at 10. It includes a supporting housing 11 which may be die-cast from aluminum or the like. The supporting housing 11 has a relatively large hollow cylindrical portion and a relatively small extending cylindrical portion 12. The supporting housing is provided with mounting brackets 13 which engage a suitable post 14. Clamping brackets 15 also engage the post 14 and are held in place by studs 16 and nuts 17, the post 14 being clamped between the brackets 13 and clamps 15 for positioning and securing the supporting housing to the post 14, as shown in Fig. 1.

The supporting housing 11 has a longitudinally vertically extending central axis and arranged within the larger portion of the supporting housing 11 concentrically with the central axis is a gear housing 20 which may also be die-cast from aluminum or the like. The gear housing 20 abuts against an internal shoulder 21 in the supporting housing 11 and the gear housing 20 is provided with a pair of diametrically opposed recesses 22 which receive resilient or elastic rubber like pads 23 which are also received in recesses 24 in the supporting housing 11. The rubber like pads 23 operate to resiliently support the gear housing 20 in the supporting housing 11 so as to prevent strains and stresses and shock loads in the supporting housing 11 from being transmitted to the gear housing 20. The exterior of the gear housing 20 is provided with a pair of longitudinally extending recesses 26 which may be utilized as a channel through which electrical conductors 27 extend. The supporting housing 11 is also provided with guy line rings 28 to assist in vertically securing the post 14.

A reversible electric motor which is preferably a capacitor type of motor is secured to the lower end of the gear housing 20, the motor having stator laminations 30 carrying field windings 31 and being secured to the gear housing 20 by screws 32. The motor also includes an armature carried by a shaft 33 concentric with the central axis of the supporting housing 11, the motor shaft 33 being journalled in a bearing 34 carried by a transverse wall 35 of the gear housing 20 and by a bearing 36 carried by a bracket 37 secured to the laminations 30 by the screws 32. Preferably, the reversible electric motor is operated by electric current at 24 volts A.C. at substantially 3500 r.p.m.

Secured in the gear housing 20 adjacent the transverse wall 35 is an internal toothed annulus member 40 having internal teeth 41. This member and its internal teeth, preferably, are accurately molded from nylon or the like and it is accurately positioned within the gear housing by a press fit in the gear housing and over the motor bearing 34 so that the internal teeth 41 are maintained concentric with the axis of the motor shaft with a high degree of accuracy and with narrow tolerances. The upper end of the motor shaft 33 carries an eccentric 42 upon which is rotatably mounted a rotor 43 by an antifriction ball bearing having an outer race 44 secured to the rotor 43 and balls 45 engaging the eccentric 42 also forming the inner race. The rotor 43 has external teeth 46 meshing with the internal teeth 41 of the annulus 40. Preferably, the rotor 43 is formed of powdered iron or the like by a suitable powdered metallurgy process. Since the teeth 41 and 46 are accurately made, since the concentricity of the assembly is accurately maintained and since the rotor 43 is mounted on the eccentric 42 by an antifriction ball bearing, extremely high efficiency in this stage of the gear reduction is obtained even though this stage operates at relatively high speeds. For purposes of illustration, the number of teeth 41 in the internal toothed annulus is 51 teeth and the number of teeth 46 on the rotor 43 is 50 teeth, and, as a result, there is provided in this stage a 50 to 1 speed reduction ratio. In other words, as the motor shaft 33 is rotated at a speed of 3500 r.p.m. so as to oscillate the rotor 43, the rotor 43 is rotated in its oscillating movement at a rotating speed of 70 r.p.m.

An output member 50 is also rotatably mounted in the gear housing 20, as indicated at 51 and it is provided with a stub shaft 52. The output member 50 and its stub shaft 52 are concentric with the central axis of the gear housing and rotate thereabout. The output member 50 is preferably formed of powdered iron or the like. An intermediate or coupling member 53 having an eccentric 54 thereon is rotatably mounted on the stub shaft 52 of the output member 50 and it is also provided with a plurality of pins 55, 6 in number being shown for purposes of illustration, which are received within enlarged holes 56 in the rotor 43. Thus, as the rotor 43 is oscillated and rotated at the reduced speed, the rotating motion thereof is transmitted through the holes 56 and pins 55 to rotate the intermediate or coupling member 53 about the central axis at the reduced speed of 70 r.p.m. Preferably, the intermediate or coupling member 53 is molded from nylon or the like so as to be resilient and elastic and provide a resilient shock absorbing coupling between the rotor 43 of the first differential gear reducer and the eccentric 54 of the second differential gear reducer.

Rotatably mounted on the eccentric 54 is a rotor 60 having external teeth 61 which mesh with internal teeth 62 of an internal toothed annulus formed in the die-cast gear housing 20. Preferably, the rotor 60 is formed of powdered iron or the like. The rotor 60 is provided with a plurality of enlarged holes 64 which receive pins 63 formed on the output member 50. For purposes of illustration, the internal teeth 62 of the internal toothed annulus are 19 in number and the external teeth 61 of the rotor 60 are 18 in number so as to provide a speed reduction ratio of 18 to 1. Thus, as the eccentric 54 is rotated at a speed of 70 r.p.m. so as to oscillate the rotor 60, the rotor 60 and the output member 50 driven thereby are rotated at a speed of substantially 3.88 r.p.m. Since the second differential gear reducer, including the eccentric 54, the external toothed rotor 60 and the internal toothed annulus 62 are operated at considerably lower speeds, wider tolerances may be utilized and still obtain highly efficient operation. This second stage of gear reduction may, therefore, be made quite rugged and this is essential inasmuch as the rotator mechanism carries heavy loads, up to 200 pounds not being unusual. The output member 50 is also provided with a central concentric extension 65 having splines 66 which form a part of a coupling for rotating the antenna.

A potentiometer base member 68 formed of electrical insulating material, such as Bakelite, is press fit into the upper end of the gear housing 20 against a shoulder 69, this base member also serving to hold the output member 50 in place within the gear housing 20. The base member 68 is provided with a concentric circular recess for receiving a resistor strip 70 having a helical potentiometer winding thereon, the resistor strip being suitably cemented in place in the base member 68. Mounted in the base member 68 in a suitable groove therein is a center tap conductor 71 and overlying this conductor is a metallic disc 72 having an outwardly extending wiper arm 73 engaging the winding on the resistor strip 70. The disc 72 is provided with ears 74 for securing the same to an electrical insulating washer 75 which is splined onto the splined extension 65 of the output member 50. A spring washer 76 is interposed between the insulating washer 75 and a Bellvue washer secured to the extension 65. Thus, the spring washer 76 operates to provide contact pressure between the metallic disc 72 having the wiper 73 and the center tap conductor 71. Thus, as the output member 50 is rotatably positioned, the wiper 73 is correspondingly rotatably positioned with respect to the potentiometer coil on the potentiometer strip 70.

A rotator member 80 in the form of a mast well is rotatably mounted in the cylindrical extending portion 12 of the supporting housing, it being guided for rotation at its lower end, as indicated at 81. The upper end of the rotator member is provided with a flange portion 82 which carries a race 83 receiving balls 84 which in turn are received in a race 85 at the upper end of the cylindrical extension 12. The ball bearing 83—85 operates to journal the rotator member for rotation concentrically with the central axis of the supporting housing 11 and also as a thrust bearing for supporting the weight of the antenna. The rotatable joint between the cylindrical extension 12 of the supporting housing and the rotator member 80 is sealed by a conventional O-ring 86. The bottom of the rotator member is splined to receive splines 87 of a coupling member 88 which is in turn splined upon the splined extension 65 of the output member 50. Thus, as the output member 50 is rotatably positioned, the coupling member 88 operates to rotatably position the rotator member 80. The rotator member 80 is preferably die-cast from aluminum or the like and the coupling member 88 is preferably formed from powdered iron or the like.

The bottom of the mast well 80 is provided with a 3-legged tapered centering member 90 which is received in the lower end of the antenna mast 91 for holding and centering the antenna mast. A plurality of wedges 92 are interposed between the antenna mast 91 and the upper end of the mast well of rotator member 80, they being wedged downwardly by a plate 93 which is carried by a plurality of studs 94 formed in the flange portion of the mast well. Springs 95 are arranged below the plate 93 and the wedging action is obtained by drawing up nuts 96 on the studs 94. Since the lower end of the antenna mast 91 is centered and anchored by the centering projection 90, and since the mast 91 is also wedged and clamped by the clamps 92, the antenna mast 91 is firmly secured centrally in the mast well 80 for rotation thereby.

The lower end of the supporting housing is closed off by a cover 98 secured in place by screws 99, the joint between the cover and the housing being sealed by an O-ring 100. The cover 98 also includes a socket 101 for receiving a plug 102 carrying a 4-wire cable 103 for electrical connection to the reversible electric motor and the potentiometer. Suitable electrical connections are made between the socket 101 and the motor and potentiometer within the sealed supporting housing 11.

The manner in which the reversible motor is operated and the manner in which the rotative position of the rotator mechanism is remotely indicated is illustrated in Fig. 8. There the rotator mechanism is designated at 10, the motor windings at 31 and 31a and the potentiometer at 70 and 73. Located remotely from the rotator mechanism 10 is a control station 105 in which there is located a transformer 106 having a primary 107 and a secondary 108. The primary 107 is connected to a suitable source 109 of alternating current at 115 volts by a 3-position switch 110, the center position being an "off" position and each end position being an "on" position. One end of the secondary winding 108 is connected by a 3-position switch 111 to conductors 114 and 115. The middle position of the switch 111 is an "off" position, one end position connects the transformer secondary to the conductor 114 and the other end position of the switch connects the transformer secondary to the conductor 115. The conductors 114 and 115 lead to the windings 31 and 31a of the reversible electric motor and they have a condenser 113 connected thereacross. The switches 110 and 111 are simultaneously operated by a suitable operator indicated at 112. The windings 31 and 31a are connected together and through the potentiometer resistance 70 and conductor 117 to the other side of the transformer secondary 108. When the switches 110 and 111 are in the mid position, as illustrated, the electric motor is de-energized. When the switches are moved to one end position, the electric motor is operated in one direction and when the switches are moved to the other end position the electric motor is operated in the opposite direction. The slider of wiper 73 of the potentiometer is connected by a conductor 116 and rheostat 118 to one side of a meter 119 which in turn is connected to the transformer secondary 108. The amount of current passing through the meter 119 is dependent upon the position of the slider of wiper 73 with respect to the potentiometer resistance 70 so that the meter 119 directly indicates the rotative position of the output member 50 and hence of the antenna. The rheostat 118 is utilized for calibration purposes.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A rotator mechanism for antennas or the like comprising, a main supporting housing having a longitudinal central axis, a gear housing secured within the supporting housing concentrically with the central axis of the supporting housing, an electric motor secured to the gear housing and having a motor shaft concentric with the central axis of the supporting housing, differential gear reducer means arranged within the gear housing concentrically with the central axis of the supporting housing and having an input member rotated by the motor shaft and an output member, a rotator member rotatably mounted in the supporting housing concentrically with the central axis of the supporting housing for rotating the antenna or the like, and a coupler member coupling the output member of the differential gear reducer means to the rotator member.

2. A rotator mechanism for antennas or the like comprising, a main supporting housing having a longitudinal central axis, a gear housing, resilient means resiliently securing the gear housing within the supporting housing concentrically with the central axis of the supporting housing, an electric motor secured to the gear housing and having a motor shaft concentric with the central axis of the supporting housing, differential gear reducer means arranged within the gear housing concentrically with the central axis of the supporting housing and having an input member rotated by the motor shaft and an output member, a rotator member rotatably mounted in the supporting housing concentrically with the central axis of the supporting housing for rotating the antenna or the like, and a coupler member coupling the output member of the differential gear reducer means to the rotator member, said resilient means absorbing shocks transmitted to the differential gear reducer means.

3. A rotator mechanism for antennas or the like comprising, a main supporting housing having a longitudinal central axis, a gear housing secured within the supporting housing concentrically with the central axis of the supporting housing, an electric motor secured to the gear housing and having a motor shaft concentric with the central axis of the supporting housing, differential gear reducer means arranged within the gear housing concentrically with the central axis of the supporting housing and including a first differential gear reducer having an input member rotated by the motor shaft and an output member, and a second differential gear reducer having an input member rotated by the output member of the first differential gear reducer and an output member, a rotator member rotatably mounted in the supporting housing concentrically with the central axis of the supporting housing for rotating the antenna or the like, and a coupler member coupling the output member of the second differential gear reducer to the rotator member.

4. A rotator mechanism for antennas or the like comprising, a main supporting housing having a longitudinal central axis, a gear housing secured within the supporting housing concentrically with the central axis of the supporting housing, an electric motor secured to the gear housing and having a motor shaft concentric with the central axis of the supporting housing, differential gear reducer means arranged within the gear housing concentrically with the central axis of the supporting housing and including a first differential gear reducer having close tolerances and having an internal toothed annulus member carried by the gear housing concentrically with the motor shaft, an eccentric secured to the motor shaft and an external toothed rotor rotatably carried by the eccentric and meshing with the internal toothed annulus member, and a second differential gear reducer having wide tolerances and having an output member rotatably mounted in the gear housing concentrically with the central axis and provided with a concentric stub shaft, an internal toothed annulus formed in the gear housing concentrically with the central axis, an eccentric rotatably mounted on the stub shaft, an external toothed rotor rotatably carried by the eccentric and meshing with the internal toothed annulus and a coupling between the rotor and the output member, resilient coupling means between the rotor of the first differential gear reducer and the eccentric of the second differential gear reducer, a rotator member rotatably mounted in the supporting housing concentrically with the central axis of the supporting housing for rotating the antenna or the like, and a coupler member coupling the output member of the second differential gear reducer to the rotator member.

5. A rotator mechanism for antennas or the like comprising, a main supporting housing having a longitudinal central axis, a gear housing secured within the supporting housing concentrically with the central axis of the supporting housing, an electric motor secured to the gear housing and having a motor shaft concentric with the central axis of the supporting housing, differential gear reducer means arranged within the gear housing concentrically with the central axis of the supporting housing and having an input member rotated by the motor shaft and an output member, a rotator member rotatably mounted in the supporting housing concentrically with the central axis of the supporting housing for rotating the antenna or the like, and a coupler member coupling the output member of the differential gear reducer means to the rotator member, a potentiometer carried by the gear housing concentrically with the central axis, and means operated by the output member of the differential gear reducer means for adjusting the potentiometer in accordance with the rotative position of the rotator member.

6. A rotator mechanism for antennas or the like comprising, a main supporting housing having a longitudinal central axis, a gear housing, resilient means resiliently securing the gear housing within the supporting housing concentrically with the central axis of the supporting housing, an electrical motor secured to the gear housing and having a motor shaft concentric with the central axis of the supporting housing, differential gear reducer means arranged within the gear housing concentrically with the central axis of the supporting housing and including a first differential gear reducer having an input member rotated by the motor shaft and an output member, and a second differential gear reducer having an input member rotated by the output member of the first differential gear reducer and an output member, a rotator member rotatably mounted in the supporting housing concentrically with the central axis of the supporting housing for rotating the antenna or the like, and a coupler member coupling the output member of the second differential gear reducer to the rotator member, said resilient means absorbing shocks transmitted to the differential gear reducer means.

7. A rotator mechanism for antennas or the like comprising, a main supporting housing having a longitudinal central axis, a gear housing, resilient means resiliently securing the gear housing within the supporting housing concentrically with the central axis of the supporting housing, an electric motor secured to the gear housing and having a motor shaft concentric with the central axis of the supporting housing, differential gear reducer means arranged within the gear housing concentrically with the central axis of the supporting housing and including a first differential gear reducer having close tolerances and having an internal toothed annulus member carried by the gear housing concentrically with the motor shaft, an eccentric secured to the motor shaft and an external toothed rotor rotatably carried by the eccentric and meshing with the internal toothed annulus member, and a second differential gear reducer having wide tolerances and having an output member rotatably mounted in the gear housing concentrically with the central axis and provided with a concentric stub shaft, an internal toothed annulus formed in the gear housing concentrically with the central axis, an eccentric rotatably mounted on the stub shaft, an external toothed rotor rotatably carried by the eccentrtic and meshing with the internal toothed annulus and a coupling between the rotor and the output member, resilient coupling means between the rotor of the first differential gear reducer and the eccentric of the second differential gear reducer, a rotator member rotatably mounted in the supporting housing concentrically with the central axis of the supporting housing for rotating the antenna or the like, and a coupler member coupling the output member of the second differential gear reducer to the rotator member, said resilient means absorbing shocks transmitted to the differential gear reducer means.

8. A rotator mechanism for antennas or the like comprising, a main supporting housing having a longitudinal central axis, a gear housing secured within the supporting housing concentrically with the central axis of the supporting housing, an electric motor secured to the gear housing and having a motor shaft concentric with the central axis of the supporting housing, differential gear reducer means arranged within the gear housing concentrically with the central axis of the supporting housing and including a first differential gear reducer having an input member rotated by the motor shaft and an output member, a second differential gear reducer having an input member and an output member, and resilient coupling means between the output member of the first differential gear reducer and the input member of the second differential gear reducer, a rotator member rotatably mounted in the supporting housing concentrically with the central axis of the supporting housing for rotating the antenna or the like, and a coupler member coupling the output member of the second differential gear reducer to the rotator member.

9. A rotator mechanism for antennas or the like comprising, a main supporting housing having a longitudinal central axis, a gear housing, resilient means resiliently securing the gear housing within the supporting housing concentrically with the central axis of the supporting housing, an electric motor secured to the gear housing and having a motor shaft concentric with the central axis of the supporting housing, differential gear reducer means arranged within the gear housing concentrically with the central axis of the supporting housing and including a first differential gear reducer having an input member rotated by the motor shaft and an output member, a second differential gear reducer having an input member and an output member, and resilient coupling means between the output member of the first differential gear reducer and the input member of the second differential gear reducer, a rotator member rotatably mounted in the supporting housing concentrically with the central axis of the supporting housing for rotating the antenna or the like, and a coupler member coupling the output member of the second differential gear reducer to the rotator member, said resilient means absorbing shocks transmitted to the differential gear reducer means.

References Cited in the file of this patent

UNITED STATES PATENTS

| 1,796,988 | Hand | Mar. 17, 1931 |
| 2,418,351 | Jackson | Apr. 1, 1947 |
| 2,581,123 | Merkle | Jan. 1, 1952 |
| 2,884,815 | Pittman | May 5, 1959 |